(12) United States Patent
Ukai

(10) Patent No.: US 9,834,385 B2
(45) Date of Patent: Dec. 5, 2017

(54) TRUCK TRANSPORTING DEVICE

(71) Applicant: MURATA MACHINERY, LTD., Kyoto-shi, Kyoto (JP)

(72) Inventor: Yasuhiro Ukai, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 15/328,174

(22) PCT Filed: Jun. 4, 2015

(86) PCT No.: PCT/JP2015/066147
§ 371 (c)(1),
(2) Date: Jan. 23, 2017

(87) PCT Pub. No.: WO2016/027549
PCT Pub. Date: Feb. 25, 2016

(65) Prior Publication Data
US 2017/0217688 A1    Aug. 3, 2017

(30) Foreign Application Priority Data

Aug. 19, 2014 (JP) .................................. 2014-166748

(51) Int. Cl.
*B65G 35/06* (2006.01)
*B61B 13/12* (2006.01)

(52) U.S. Cl.
CPC .............. *B65G 35/06* (2013.01); *B61B 13/12* (2013.01)

(58) Field of Classification Search
CPC ................................ B65G 35/06; B61B 13/12

USPC .............................. 198/624, 722, 723, 465.3
See application file for complete search history.

(56) References Cited

U.S. PATENT DOCUMENTS

| | | | |
|---|---|---|---|
| 3,263,775 A * | 8/1966 | Lachance ................ | A47F 9/045 186/64 |
| 6,494,142 B2 * | 12/2002 | Masugaki .............. | B65G 35/06 104/168 |
| 7,063,204 B1 * | 6/2006 | Pfeiffer .............. | H05K 13/0061 198/465.2 |

(Continued)

FOREIGN PATENT DOCUMENTS

| | | |
|---|---|---|
| JP | 58-158010 U | 10/1983 |
| JP | 60-015303 A | 1/1985 |

(Continued)

OTHER PUBLICATIONS

English translation of Official Communication issued in corresponding International Application PCT/JP2015/066147, dated Feb. 23, 2017.

(Continued)

*Primary Examiner* — Mark A Deuble
(74) *Attorney, Agent, or Firm* — Keating & Bennett, LLP

(57) ABSTRACT

A transportation device transports carts including caster wheels along a transportation path without a pit. Side rollers are arranged along the transportation path and at both sides of the transportation path. Springs bias the side rollers into contact with side surfaces of the carts within the transportation path. A motor drives at least some of the side rollers that are arranged at an interval shorter than a length of the carts along the transportation path at the both sides of the transportation path.

12 Claims, 3 Drawing Sheets

(56) References Cited

U.S. PATENT DOCUMENTS

| | | | | |
|---|---|---|---|---|
| 7,093,543 | B2* | 8/2006 | Nakamura | B65G 35/06 104/96 |
| 8,496,103 | B2* | 7/2013 | Federmann | B65G 35/06 104/171 |
| 2005/0051047 | A1 | 3/2005 | Nakamura et al. | |
| 2007/0283839 | A1* | 12/2007 | Bartlett, Jr. | B61B 13/12 104/165 |
| 2013/0015039 | A1 | 1/2013 | Murakami et al. | |
| 2013/0048472 | A1* | 2/2013 | Rhodes | B61B 10/04 198/793 |

FOREIGN PATENT DOCUMENTS

| | | |
|---|---|---|
| JP | 63-134409 A | 6/1988 |
| JP | 2002-173219 A | 6/2002 |
| JP | 2006-151255 A | 6/2006 |
| JP | 2013-237537 A | 11/2013 |
| WO | 2009/060528 A1 | 5/2009 |

OTHER PUBLICATIONS

Official Communication issued in International Patent Application No. PCT/JP2015/066147, dated Sep. 1, 2015.

* cited by examiner

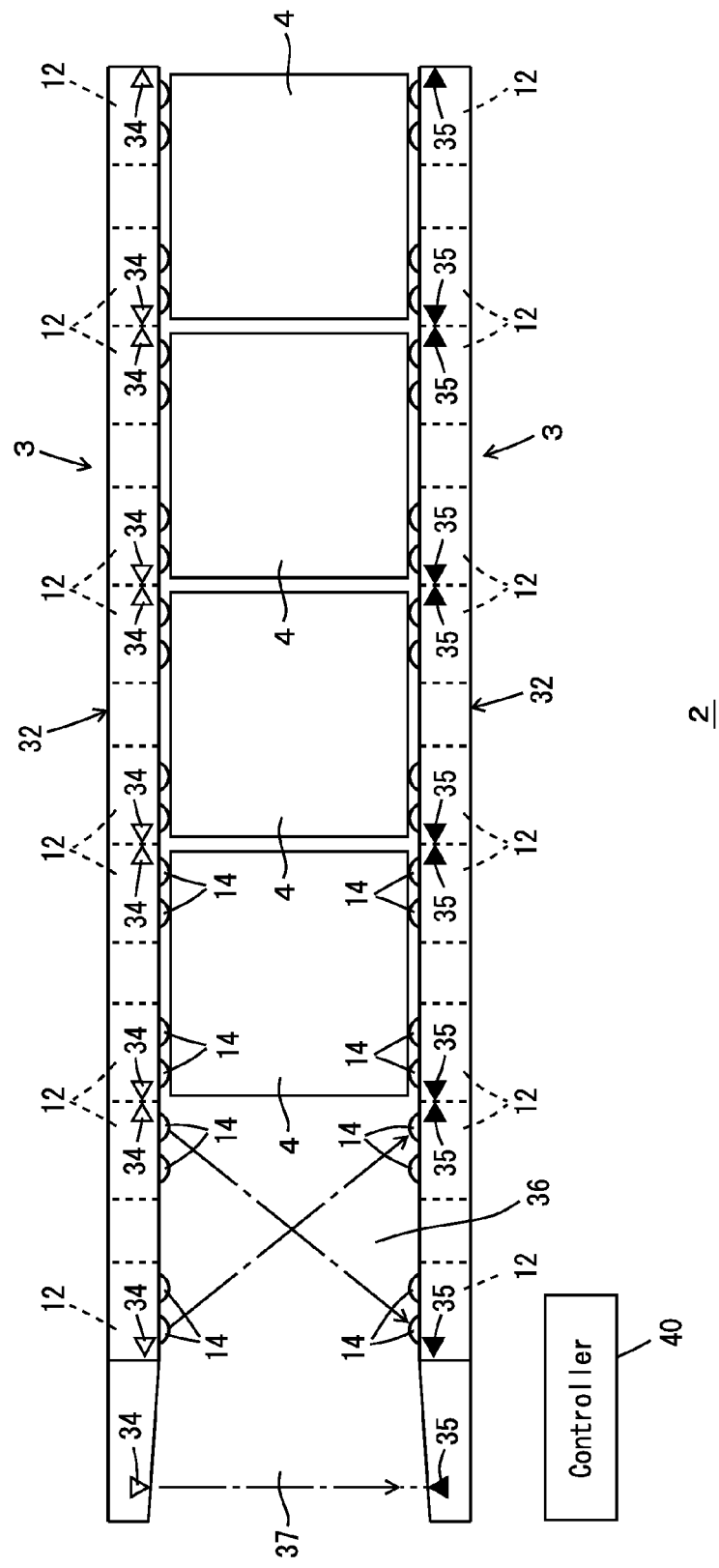

TRUCK TRANSPORTING DEVICE

BACKGROUND OF THE INVENTION

1. Field of the Invention

The present invention relates to a transportation device for carts including caster wheels.

2. Description of the Related Art

Carts having caster wheels have been widely used for the transportation of goods, and, therefore, another transportation device for these carts is also required. For, example, JP2013-237537A has proposed to dig a pit under a floor of a building for providing a slat conveyor. However, it is difficult to dig a pit in an existing building for the instalment of a slat conveyor. There are problems other than difficult installment, such as that articles falling from the carts damage the slats of conveyor and that it is difficult for carts to pass by gaps between the conveyors when plural conveyors are installed in series.

SUMMARY OF THE INVENTION

Preferred embodiments of the present invention provide a transportation device that transports carts equipped with caster wheels without needing to dig a pit.

A transportation device according to a preferred embodiment of the present invention transports carts including caster wheels along a transportation path and includes side rollers arranged along the transportation path and at both sides of the transportation path, at a height to contact with side surfaces of the carts; biasing elements biasing and making the side rollers contact with the side surfaces of the carts within the transportation path; and a motor to drive at least some of the side rollers, wherein the side rollers driven by the motor are arranged with an interval shorter than a length of the carts along the transportation path and at both sides of the transportation path.

According to a preferred embodiment of the present invention, it is not needed to dig a pit under a floor, since no conveyor on the floor is needed. The side rollers are biased by the biasing elements so as to be in contact with the side surfaces of the carts, and the carts are transported by the friction with the side rollers. Therefore, variations in the width of the carts are permitted. Further, since side rollers driven by the motor are arranged at an interval shorter than the length of the carts along the transportation path and at both sides of the transportation path, carts at any position within the transportation path may be moved.

Preferably, the side rollers include pneumatic rubber tires. As a result, carts having unevenness on the side surfaces may be transported.

Preferably, the motor to drive the side rollers is not equipped with a brake, and, as is expected, no brake for fixing the side rollers is provided at other portions than the motor. As a result, problems in the motor do not prevent the carts from being moved by manual power or the like.

Preferably, the side rollers are superimposed at least on a two-stage structure along the height direction. With this configuration, side rollers at one of the stages contact the side surfaces of the carts, in particular, metal or plastic plates at lower portions of the carts and may transport the carts.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a plan view of a transportation device for carts according to a preferred embodiment of the present invention.

DETAILED DESCRIPTION OF THE PREFERRED EMBODIMENTS

In the following, preferred embodiments of the present invention will be described.

Figure 1:
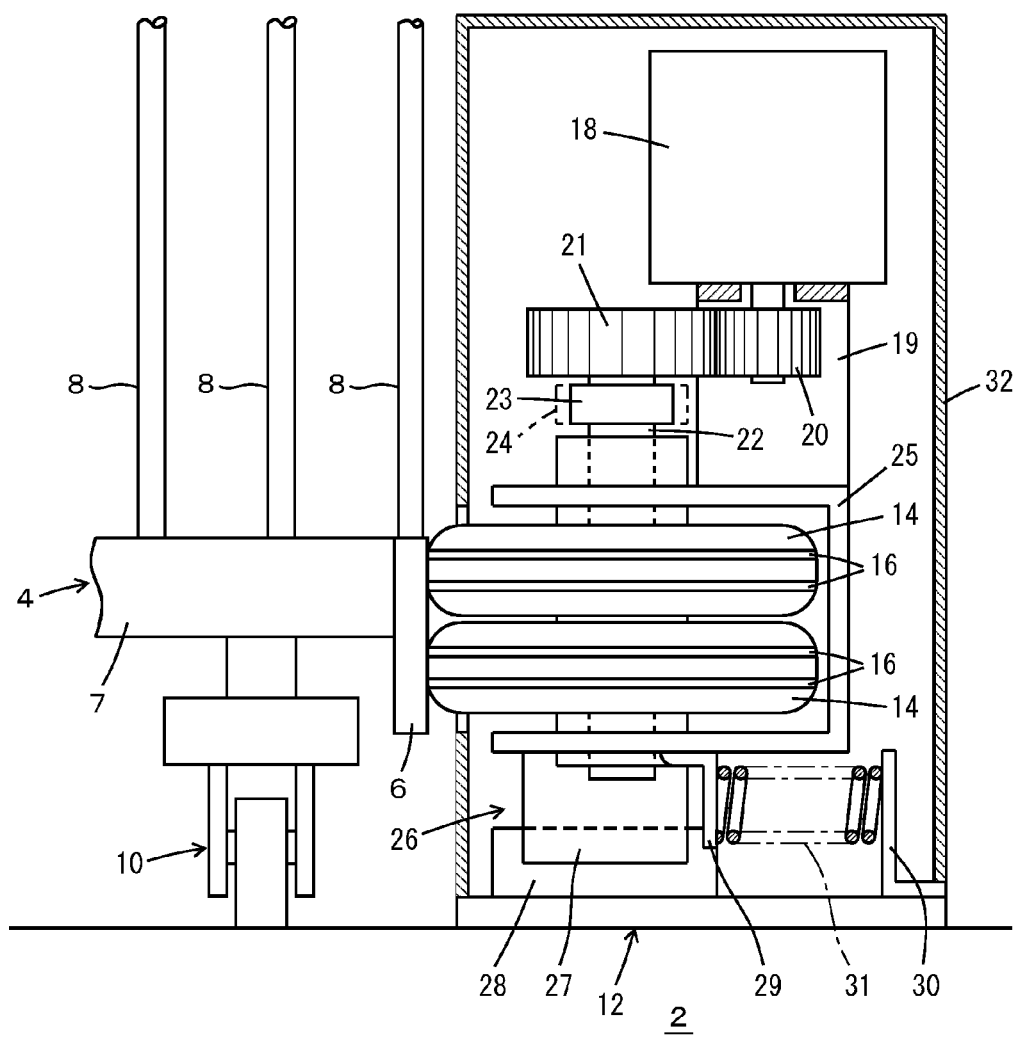
FIG. 1 is a fragmentary sectional view along a short-side direction of a cart and a transportation device for carts according to a preferred embodiment of the present invention.
Figure 2:
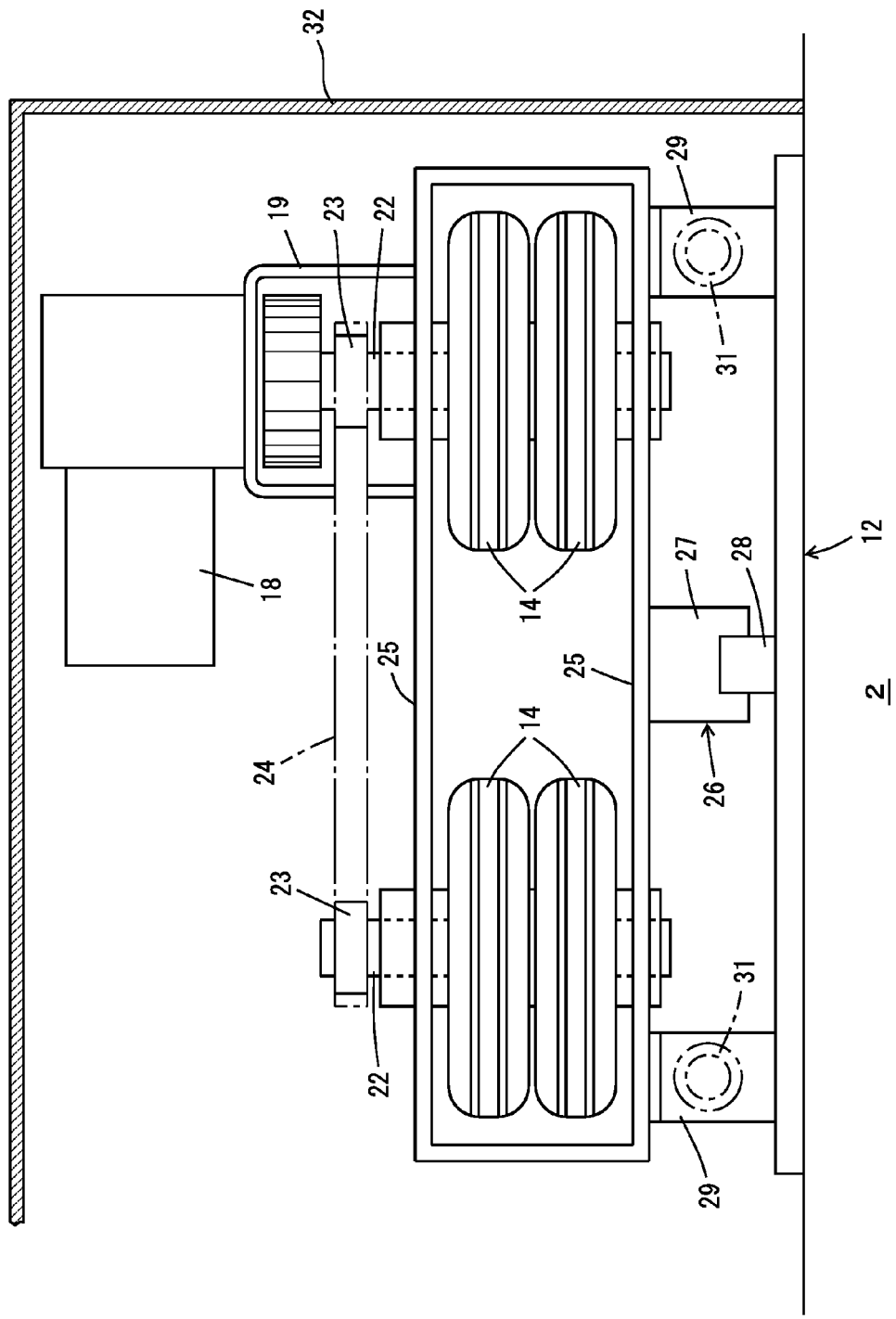
FIG. 2 is a fragmentary sectional view along a longitudinal direction of a transportation device for carts according to a preferred embodiment of the present invention.

FIGS. 1-3 show a transportation device for carts 2 according to a preferred embodiment of the present invention. FIG. 1 shows a cart 4 to be transported and major portions of the transportation device 2. The cart 4 is, for example, a cage-cart which includes frames 6, 7 on lower portions of four sides, and pipes 8 are attached to the frames 6, 7 to define a cage. Further, the cart 4 is provided with plural caster wheels 10 so that the cart may be moved by being pushed by human hands. Since the cart may be roughly treated, the frames 6,7 of the cart 4 may have unevenness, and the height of the frames 6, 7 are changed according to the specifications. In the following, the transportation device for carts may be called simply the transportation device 4.

The transportation device for the carts 2 causes plural carts 4 to be aligned in a row, and if there is an empty space in front of a cart, then fills the empty space by moving the cart forward to store carts temporarily. At this time, some carts are loaded and some are unloaded. The transportation device 2 includes plural transportation units 12 along the transportation direction (the longitudinal direction of the transportation device 2, and a direction from the left to the right in FIG. 3), and the structure of the plural transportation units 12 is shown in FIGS. 1 and 2. Pneumatic tires 14 are, for example, superimposed on a two-stage structure, but they may be superimposed on three or more stages or may not be superimposed. The tires 14 include draining grooves 16 on the surface and are filled with air, but solid tires such as urethane rubber tires may be used. A motor 18 transports carts 4 by rotating the tires 14, 14 and by the friction between them and is preferably a brake-less motor, for example. Further, it is preferable not to provide any brake to inhibit the rotation of tires 14, 14 also at any position other than the motor 18. A table 19 supports the motor 18, a shaft 22 rotates the tires 14, 14 through gears 20, 21 which transmit the output of the motor 18 to the shaft 22. Further, the transportation unit 12 includes, for example, two pairs of the upper and lower tires 14, 14 along the transportation direction, and a pair of tires 14, 14 that are remote from the motor 18 are driven by driving medium such as a chain.

Components such as the tires 14 and motor 18 are attached to a movable frame 25 and may slide along a direction perpendicular or substantially perpendicular to the transportation direction in a horizontal plane. The movable frame 25 moves horizontally by a linear guide 26 and is biased to a space where the carts move by a spring 31 defining a biasing element. The linear guide 26 includes a movable portion 27 and a fixed portion 28, and the spring 31 is provided between a bracket 29 of the movable frame 25 and a bracket 30 fixed to the ground. A casing 32 covers the transportation device 2 except for the tires 14, 14. The spring 31 may be a leaf spring, or an air spring other than a coil spring, and an air cylinder may be used as the biasing member, for example.

As is shown in FIG. 3, panels 3 that include a plurality of the transportation units 12 arranged along the transportation direction are provided at both sides of the transportation path 36 and the panels are included in the transportation device for carts 2. The transportation device for carts 2 aligns in a row plural carts that enter into the transportation path 36 from the left side in FIG. 3 and, if there is an open space, causes the carts to move forward so as to fill up the open space. Further, the distance along the transportation direction between the tires 14, 14 that are driven by the motor 14 is made shorter than the length of the carts, and, according to the present preferred embodiment, a pair of transportation units 12 are provided per the length of the cart 4 so that the carts 4 may be transported from any position within the transportation path 36. Further side rollers that are not driven by the motor 18, may be provided and may make contact with the side surfaces of the carts 4 to guide the carts 4. The intervals between such side rollers are not important.

Light emitting portions 34 and light receiving portions 35 detect the presence or absence of a cart 4 at each position within the transportation path 36. A controller 40 controls the transportation units 12 according to the signals from the light receiving portions 35 and so on. Arbitrary species of sensors that detect the presence or absence of the cart 4 may be used. Further, according to the present preferred embodiment, an additional transportation unit 12 is provided at the right end in FIG. 3 (the exit of the transportation path 36) so that the carts are pushed out of the transportation device 2 by the motor power. However, they may be taken out by human power, and, in the case, the additional transportation unit 12 at the right end of FIG. 3 is not needed.

How the present preferred embodiment works will be described. In FIG. 3, the transportation device 2 includes a space to align, for example, five carts 4 in a row and an entrance 37. An operator pushes a cart 4, for example, by hand into the transportation path 36. The transportation device 2 monitors the presence or absence of a cart 4 at each space corresponding to one cart 4, and, if a cart 4 is present in one space and if the next space is empty, the transportation device causes the transportation units in these spaces to work and causes the cart 4 to move forward by the friction between tires 14 and the frames 6, 7. When the light receiving portion 35 at the upstream space becomes not to detect the cart 4, the transportation device 2 causes the transportation units 12 to stop, since the cart 4 is expected to have advanced into the next space.

The transportation device 2 may be easily installed, since digging a pit under the floor is not needed for the installment, and, moreover, articles falling from the carts 4 to the floor do not collide with the transportation device 2. The carts 4 having unevenness on the frames 6, 7 may be transported by the pneumatic tires 14. Further, the two-staged tires 14 along the height direction may transport the carts 4 having various heights of the frames 6, 7. Since the tires 14 are arranged with a short interval along the transportation direction, carts 4 may be moved from any position within the transportation device 2. Further, the tires 14 are biased toward the carts 4, the variations in the width of the carts 4 do not matter, and, even if the air in the tires 14 is lost, they continue the transportation with the biasing force by the spring 31. Further, regarding wet carts 4, water is drained along the grooves 16 of the tires 14, and the tires 14 do not slip on the carts 4. Since the motor 18 is not equipped with a brake, problems in the motor 18, and so on, do not lock or fix the tires 14, and carts 4 may be retrieved, for example, manually.

When a further mechanism is provided to bias the movable frame 25 upwardly, the up and down movement of the carts 4 that is caused due to the unevenness of the transportation path 36, and so on, never damages the carts 4. According to the present preferred embodiment, all the tires are driven by the motor power, however, when some of the tires are not power-driven, it is enough that the tires 14 driven by the motor power are arranged with an interval shorter than the length of the carts 4.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transportation device for transporting carts including caster wheels along a transportation path including an entrance and an exit, the transportation device comprising:
   side rollers arranged along the transportation path and at both sides of the transportation path, at a height to contact with lower portions of side surfaces of the carts;
   biasing elements biasing the side rollers into contact with the lower portions of the side surfaces of the carts within the transportation path; and
   a motor configured to drive at least some of the side rollers that are arranged with an interval shorter than a length of the carts along the transportation path and at both sides of the transportation path; wherein
   the motor and the side rollers driven by the motor transport and align the carts within the transportation path in a row from the entrance to the exit of the transportation path such that:
      when a first space that corresponds to one of the carts is occupied by one of the carts and a second subsequent space, which corresponds to one of the carts and is in front of the first space and within the transportation path, is empty, the one of the carts is forwarded to the second space by the side rollers driven by the motor to fill the second space; and
      when the first space becomes an empty space between two of the carts within the transportation path, a rear cart of the two of the carts is forwarded to fill the empty space.

2. The transportation device according to claim 1, further comprising sensors that detect presence or absence of at least one of the carts provided for each space corresponding to one of the carts within the transportation path, wherein the transportation device transports and aligns the carts within the transportation path one by one in a row to fill the empty space.

3. The transportation device according to claim 2, wherein, based upon detection by one of the sensors that the first space within the transportation path is occupied by the one of the carts and the second subsequent space within the transportation path is empty, both the side rollers driven by the motor in the first space and the side rollers driven by the motor in the second space are rotated and the one of the carts is forwarded to the second space.

4. The transportation device according to claim 1, further comprising a pair of panels provided along both sides of the transportation path accommodating the motor, the side rollers driven by the motor, and the biasing elements.

5. The transportation device according to claim 1, wherein the carts are cage-carts provided with a plurality of caster wheels, frames at the lower portions of the side surfaces of the carts, and pipes extending upwardly from the frames.

6. The transportation device according to claim 1, wherein the side rollers include pneumatic rubber tires.

7. The transportation device according to claim 1, wherein the motor is not equipped with a brake.

8. The transportation device according to claim 7, wherein the transportation path is structured to allow the carts to be transported by manual power.

9. The transportation device according to claim 8, wherein the transportation path is structured to allow the carts to be introduced into the transportation path by manual power and to be removed from the transportation path by manual power.

10. The transportation device according to claim 1, wherein the side rollers include side rollers not driven by the motor.

11. The transportation device according to claim 1, wherein the side rollers are superimposed at least on a two-stage structure along a height direction.

12. The transportation device according to claim 1, further comprising transportation units equipped with the motor, wherein at least one of the side rollers is driven by the motor, and at least one of the biasing elements is arranged along the transportation path and at both sides of the transportation path at an interval shorter than a length of the carts.

* * * * *